UNITED STATES PATENT OFFICE.

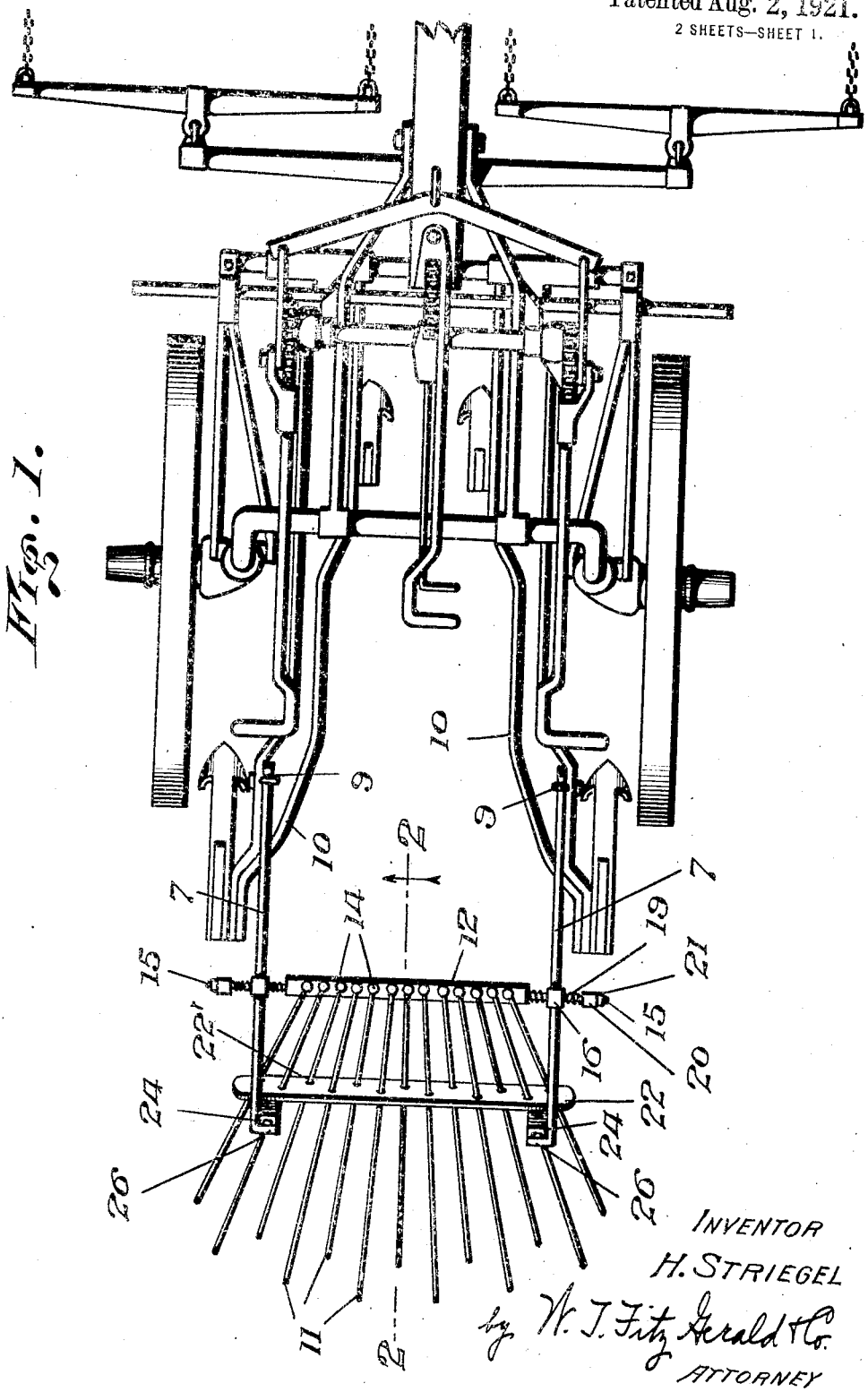

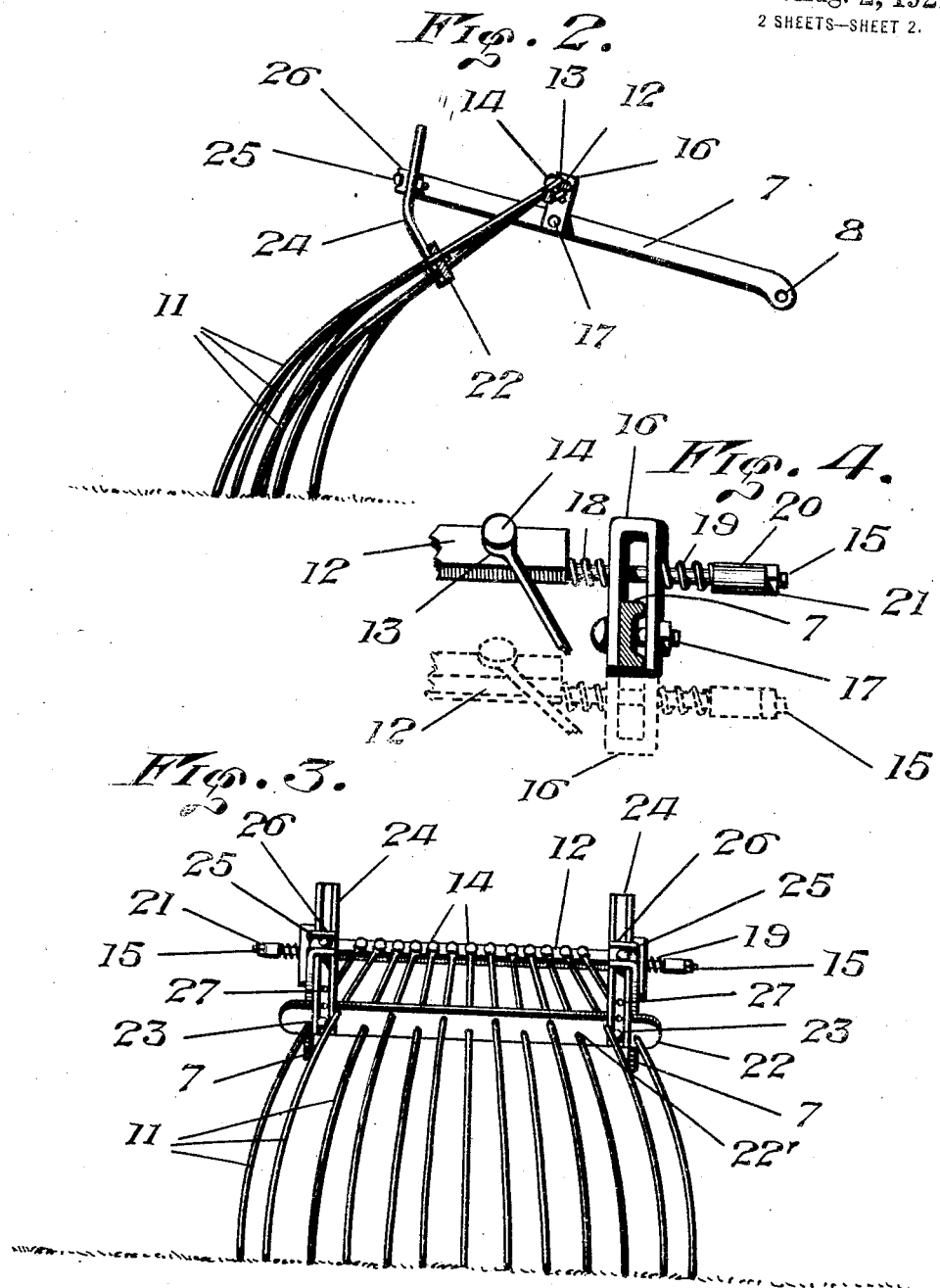

HENRY STRIEGEL, OF WILDER, KANSAS.

SOIL-PULVERIZER.

1,386,286.　　　Specification of Letters Patent.　　Patented Aug. 2, 1921.

Application filed July 27, 1920. Serial No. 399,313.

*To all whom it may concern:*

Be it known that I, HENRY STRIEGEL, a citizen of the United States, residing at Wilder, in the county of Johnson and State of Kansas, have invented certain new and useful Improvements in Soil-Pulverizers; and I do hereby declare the following to be a full, clear, and exact description of the invention, such as will enable others skilled in the art to which it appertains to make and use the same.

The present invention relates to a soil pulverizer, adapted especially for attachment to a riding cultivator, or the like, and it is the object of the invention to provide such device of novel and improved construction for leveling down ridges of soil left by the cultivator, to keep the soil from drying out, and to also remove lumps of or loose dirt from the plants which cover the plants or interfere with the growth thereof, as well as breaking up the lumps of dirt and pulverizing the soil.

It is the object of the invention to provide such a device having flexible trailing teeth mounted in a novel manner to drag over the row of plants for accomplishing the results above indicated, without injuring the plants.

A further object is the provision of novel and improved means for mounting the teeth and for attaching them to the cultivator or similar appliance, whereby such cultivator or appliance can be operated in the usual manner and the attachment raised from the ground with cultivator blades or shovels, as when turning around or traveling on the road.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a plan view of the device as attached to a cultivator.

Fig. 2 is a section on the line 2—2 of Fig. 1.

Fig. 3 is a rear view of the device.

Fig. 4 is a detail view showing the mounting of one end of the transverse tooth anchor bar.

In carrying out the invention, the device comprises a pair of longitudinal side draw bars 7, having apertures 8 at their forward ends, for pivotally connecting said bars, by means of bolts 9 or the like, with the beams 10 or other suitable parts of the cultivator (a conventional type of cultivator being shown in Fig. 1). The beams 10 can be of any suitable length for attachment to various cultivators or appliances and to various parts thereof, and, as shown, the bars 7 extend over the rear portions of the beams 10, whereby said bars can swing upwardly away from the beams, but when the beams are raised, as when turning the cultivator or traveling on the road, the bars 7 will be lifted with the beams thereby raising the device automatically off of the ground.

The device has a set of flexible teeth 11 anchored at their forward ends to a transverse anchor bar 12 disposed between the ends of the bars 7. As shown, the forward ends of the inclined teeth 11 have eyes or loops 13 secured by bolts 14, or the like, on the bars 12, thereby pivoting and anchoring the teeth to said bars.

The bar 12 is supported from the bars 7, and is provided at its ends with pintles or trunnions 15 extending through U-shaped bearings 16 for rotary and sliding movement, and said bearings straddle the bars 7 and are clamped to said bars by means of bolts 17, or the like. A coiled expansion spring 18 is disposed on each pintle 15 between the corresponding bearing 16 and end of the bar 12, and a similar spring 19 is disposed on said pintle at the opposite side of the bearing 16, between said bearing and a sleeve 20 on the pintle retained thereon by means of a nut 21 or other retaining element secured on the end of the pintle. The springs 18 and 19 permit the bars 7 to move or shift laterally with the beams 10 in operating the cultivator, thereby rendering the device flexible so as not to interfere with the movement of the beams 10 during the cultivating operation. The bearings 16 can be disposed above or below the bars 7 as illustrated in full and dotted lines, respectively, as seen in Fig. 4, in order that the bar 12 can be supported in two different vertical positions, to regulate the angle of inclination of the teeth 11.

The teeth 11 diverge rearwardly and extend rearwardly and downwardly at an angle, and pass through a transverse spacing bar 22. The apertures 22' of said bar through which the teeth extend are in staggered relation, whereby the teeth are also staggered, and the apertures are also spaced apart farther than the bolts 14, whereby the teeth diverge rearwardly, to spread the lower free ends thereof. The bar 22 is secured by means of bolts 23, or the like, to the lower terminals of hangers 24, which are in turn secured by means of bolts 25, or the like, to the rear angularly bent end portions 26 of the bars 7. The hangers 24 have series of apertures 27 for the bolts, whereby the bar 22 can be adjusted vertically, which, in addition to the vertical adjustment of the bar 12 above or below the bars 7, as seen in Fig. 4, will enable the teeth 11 to be disposed at a greater or less angle to the ground, according to the conditions under which the device is used. Thus, referring to Fig. 2, if the bar 12 be adjusted below the bars 7, or the bar 22 raised, this will decrease the angle between the teeth and ground, as may be desired under certain conditions.

The rear free terminals of the teeth are freely flexible, and when the cultivator is in operation, the device will drag on the ground over the row of plants without injuring them, the plants passing between the teeth and the teeth springing away from the plants.

The teeth in dragging or trailing on the ground, will level the ridges and break up the lumps, so as to pulverize the soil, as well as dislodge any lumps or dirt which cover or obstruct the plants, thereby not only pulverizing the soil to retain the moisture underneath, but also freeing the plants from obstruction, to aid in their growth.

By adjusting the bars 12 and 22 to different vertical positions, the distance between them is changed, whereby the teeth 11 in sliding through the bar 12, will have their rear ends spread apart farther or brought closer together so that the inclined position of the teeth as well as the spacing of the rear ends thereof can be regulated according to the wishes. The angular adjustment and spacing of the rear ends of the teeth is also controlled by loosening the bolts 17 and swinging the bearings 16 to different angular positions.

Having thus described the invention, what is claimed as new is:—

1. A soil pulverizer comprising a pair of rearwardly extending bars, a pair of longitudinally spaced transverse bars, rearwardly and downwardly extending teeth anchored to one transverse bar and slidable through the other, and means for attaching said transverse bars to the first named bars for the relative vertical adjustment of said transverse bars to change the angular position of said teeth.

2. A soil pulverizer comprising a pair of rearwardly extending bars having means at their forward ends for attachment to the beams of a cultivator, a pair of longitudinally spaced transverse bars carried by the first named bars, one of the transverse bars having a slidable connection with the first named bars for the movement of the forward ends of the first named bars toward and away from one another with the cultivator beams, rearwardly and downwardly extending teeth anchored to one transverse bar and slidable through the other, and spring means between the first named bars and said slidable transverse bar for retaining said transverse bar in position and permitting the first named bars to move toward and away from one another.

3. A soil pulverizer comprising a pair of rearwardly extending bars, a pair of longitudinally spaced transverse bars, rearwardly and downwardly extending diverging teeth pivotally anchored to one transverse bar and slidable through the other, and means for connecting said transverse bars to the first named bars for the turning movement of one transverse bar about its axis and for the upward and downward movement of the other transverse bar.

4. A soil pulverizer comprising a pair of rearwardly extending draw bars, a transverse bar connected to said draw bars near the rear ends thereof for upward and downward adjustment, bearings mounted on the draw bars between the ends thereof for adjustment to different positions, a transverse anchor bar having pintles slidable through said bearings, springs between said pintles and bearings to permit of the transverse movement of said draw bars, and rearwardly and downwardly extending diverging teeth pivotally anchored to said anchor bar and slidable through the first named transverse bar.

5. A soil pulverizer comprising a pair of longitudinal draw bars, having hangers at their rear ends, a transverse bar carried by said hangers, bearings carried by the draw bars for adjustment to different positions, a second transverse bar having pintles mounted in said bearings, and diverging teeth slidable through the first named transverse bar and pivotally anchored to the second transverse bar.

6. A soil pulverizer comprising a pair of longitudinal draw bars, a transverse bar supported from said draw bars at the rear ends thereof, bearings mounted on the draw bars between the ends thereof, a transverse anchor bar having terminal pintles slidable through said bearings, teeth anchored to the anchor bar and engaging the first named transverse bar, and springs on said pintles bearing against said bearings to permit of transverse movement of the draw bars.

7. A soil pulverizer comprising a pair of longitudinal draw bars, a transverse bar supported therefrom near the rear ends thereof, bearings, means for securing said bearings to the draw bars for adjustment to different angles and to positions above and below the draw bars, a transverse anchor bar having pintles engaging said bearings, and teeth sliding through the first named transverse bar and pivotally anchored to the anchor bar.

In testimony whereof I have signed my name to this specification in the presence of two subscribing witnesses.

HENRY STRIEGEL.

Witnesses:
R. S. FIEKIN,
FRED SCHNEIDER.